US012128447B2

United States Patent
(12) United States Patent
Van Rijckevorsel

(10) Patent No.: US 12,128,447 B2
(45) Date of Patent: Oct. 29, 2024

(54) METHOD FOR SEPARATING AND CLASSIFYING WASTE, IN PARTICULAR PACKAGING

(71) Applicant: SUEZ GROUPE, Paris la Defense (FR)

(72) Inventor: Franz Van Rijckevorsel, Paris la Defense (FR)

(73) Assignee: SUEZ INTERNATIONAL, Paris (FR)

( * ) Notice: Subject to any disclaimer, the term of this patent is extended or adjusted under 35 U.S.C. 154(b) by 497 days.

(21) Appl. No.: 17/297,631

(22) PCT Filed: Nov. 26, 2019

(86) PCT No.: PCT/EP2019/082636
§ 371 (c)(1),
(2) Date: May 27, 2021

(87) PCT Pub. No.: WO2020/109335
PCT Pub. Date: Jun. 4, 2020

(65) Prior Publication Data

US 2022/0023917 A1 Jan. 27, 2022

(30) Foreign Application Priority Data

Nov. 27, 2018 (FR) ....................................... 1871883

(51) Int. Cl.
*B07C 5/342* (2006.01)
*B07C 5/34* (2006.01)

(52) U.S. Cl.
CPC ............ *B07C 5/342* (2013.01); *B07C 5/3408* (2013.01); *B07C 2501/0054* (2013.01); *B07C 2501/0063* (2013.01)

(58) Field of Classification Search
CPC .................. B07C 5/342; B07C 5/3408; B07C 2501/0054; B07C 2501/0063
See application file for complete search history.

(56) References Cited

U.S. PATENT DOCUMENTS 5,794,788 A 8/1998 Massen
5,894,939 A 4/1999 Frankel
(Continued)

FOREIGN PATENT DOCUMENTS

CN 104624505 B 8/2016
EP 0 838 274 4/1998
(Continued)

OTHER PUBLICATIONS

International Search Report for PCT/EP2019/082636 dated Feb. 24, 2020, 5 pages.
(Continued)

*Primary Examiner* — Michael McCullough
*Assistant Examiner* — Kalyanavenkateshware Kumar
(74) *Attorney, Agent, or Firm* — NIXON & VANDERHYE

(57) ABSTRACT

Disclosed is a system and a method for classifying articles in a flow of articles to be separated, the flow of articles to be separated being installed on a conveying device, including: —an image acquisition member installed so as to be able to acquire at least one image of a portion of the flow of articles to be separated; —a first overhanging light source, which emits in the visible spectrum and illuminates the portion of the flow of articles to be separated, the at least one image of which is acquired by the image acquisition member; a classification member capable of classifying the articles of the portion of the flow of articles to be separated according to the acquired image; and at least one second light source, of a different nature than the first light source, allowing additional visual information to appear on the acquired image.

20 Claims, 4 Drawing Sheets

(56) References Cited

U.S. PATENT DOCUMENTS

| | | | | |
|---|---|---|---|---|
| 6,610,953 B1 * | 8/2003 | Tao | ......................... | B07C 5/342 209/11 |
| 2010/0230327 A1 | 9/2010 | Hartrumpf | | |
| 2010/0245559 A1 | 9/2010 | Graze | | |
| 2015/0219557 A1 | 8/2015 | Skaff | | |
| 2018/0243800 A1 | 8/2018 | Kumar et al. | | |
| 2018/0252691 A1 * | 9/2018 | Blanc | ...................... | B07C 5/342 |

FOREIGN PATENT DOCUMENTS

| | | | |
|---|---|---|---|
| EP | 1111375 | A1 | 6/2001 |
| EP | 1967294 | A2 | 9/2008 |
| EP | 2 832 458 | | 2/2015 |
| EP | 3310501 | | 4/2018 |
| KR | 20130019818 | A | 2/2013 |
| WO | 2013/027083 | | 2/2013 |
| WO | 2015/063300 | | 5/2015 |
| WO | 2016204619 | A2 | 12/2016 |

OTHER PUBLICATIONS

Written Opinion of the ISA for PCT/EP2019/082636 dated Feb. 24, 2020, 5 pages.

Gu et al., "Discriminative Illumination: Per-Pixel Classification of Raw Materials based on Optimal Projections of Spectral BRDF", 2012 IEEE Conference on Computer Vision and Pattern Recognition, Providence, RI, USA, 2012, pp. 1-8.

* cited by examiner

METHOD FOR SEPARATING AND CLASSIFYING WASTE, IN PARTICULAR PACKAGING

CROSS-REFERENCE TO RELATED APPLICATIONS

This application is the U.S. national phase of International Application No. PCT/EP2019/082636 filed Nov. 26, 2019 which designated the U.S. and claims priority to FR 1871883 filed Nov. 27, 2018, the entire contents of each of which are hereby incorporated by reference.

BACKGROUND OF THE INVENTION

Field of the Invention

The present invention relates to the field of the classification and sorting of waste and particularly packaging, especially packaging made from glass, metal, plastics material, paper and cardboard.

Description of the Related Art

A first type of technology used for automated sorting is based on optical-sorting machines, which generally use light spectrometry for classifying the material of the objects in a flow of waste. According to this technology, the objects are irradiated by a light spectrum, generally in the infrared lengths, sometimes supplemented by complementary analyses, and a sensor records the reflected spectrum, to compare it with spectra recorded in a database of spectra, which makes it possible to identify the material of the irradiated objects. Such a method is for example described in the application WO2013/027083. However, the performance in distinguishing between the various materials is not completely satisfactory, in particular in the field of plastics material, where novel complex flows have been put on the market, (of the multilayer type, complex assemblies, novel opaque resins, etc.) which are not always well recognized or in the case of the demand of buyers for high purity levels (sometimes much greater than 95%) required for recycling certain plastics.

Thus recently systems using image analysis in the visible spectrum have appeared, in particular by means of the development of artificial intelligence, and by means of the algorithms developed by virtue of learning methods using image banks ("deep learning") in order to recognize the object itself (through its shape, its appearance, etc.) rather than the material making up an object. Recognition of the objects to be sorted by waste-sorting robots (or simply to be classified), currently on the market is generally based on a system of gantries for classifying the waste on a line allowing the analysis of images obtained by illumination under white light and detection in the visible spectrum. Typically, the flow of objects (bottles, dishes, food trays, cans, boxes, films, pieces of paper or cardboard, etc.) is illuminated by a white light, and the images are captured by a camera (active in visible light), images that are then analyzed using algorithms for identifying/classifying the objects in the flow.

However, the performance of these detection systems in the visible spectrum are still below the expectations of the operators (at the present time, recognition levels of around 85% on average) and the qualities of the products after sorting by the robots do not in general meet the criteria of buyers of secondary raw materials, requiring the addition of human sorters to complement the robots.

This low level of performance of the object-recognition system is in particular due to the fact that the analysis is currently done solely with white light and with a camera in the visible spectrum: there are therefore few contrasts and distinguishing factors for the identification. In particular, transparent objects are little visible, superimposed objects may be poorly identified (a transparent bottle on top of a colored bottle is generally considered to be a colored bottle for example) and nested objects are poorly identified (in particular bottles made from PET (polyethylene terephthalate) nested in an aluminum can). Mention can also be made of the problem of distinguishing between opaque PET and HDPE (high density polyethylene), two plastics used for manufacturing milk bottles: opaque PET is currently considered to be a contaminant of HDPE and it is therefore necessary to reduce to a minimum the proportion of opaque PET in batches of HDPE, but the current automatic sorting systems for the moment give only mediocre performance.

There is therefore a need for a method and a system for automated waste sorting that is more discriminating while being simple to implement and if possible with little extra cost compared with the systems currently on the market.

SUMMARY OF THE INVENTION

The applicant has demonstrated that the use of lights of different natures for irradiating a flow of waste makes it possible to obtain more contrasted images, facilitating the image analysis and resulting in better discrimination of the waste according to the material thereof.

It will be noted that the invention applies not only to the classification and sorting of waste, but also to the classification and sorting of any object in general.

Thus one object of the invention relates firstly to a system for classifying objects in a flow of objects to be sorted, the flow of objects to be sorted being installed on a conveying device, comprising:

- an image acquisition device installed so as to be able to acquire at least one image of a portion of the flow of objects to be sorted, the image acquisition device visually covering a zone called the object identification zone;
- a first light source, emitting in the visible spectrum, installed overhanging and illuminating said portion of flow of objects to be sorted, said at least one image of which is acquired by the image acquisition device 8;
- a classification device able to classify the objects in said portion of the flow of objects to be sorted according to said at least one image acquired.

The system being characterized in that it further comprises at least one second light source, with a nature distinct from the first light source, allowing the appearance of additional visual information on said at least one image acquired.

The appearance of this additional visual information, whether it be a reflection of colors and/or fluorescence, makes it possible to add additional distinguishing pixels in the acquired image in order to improve the classification of the objects in the image.

Advantageously and non-limitatively, said at least one second light source emits an ultraviolet light allowing the appearance of fluorescence in the visible spectrum when an object in the portion of flow of objects reacts to the ultraviolet.

Advantageously and non-limitatively, said at least one second light source emits a light in the visible spectrum, with a color and/or intensity distinct from the first light source, and oriented so as to illuminate, at an illumination angle distinct from the first light source, the objects in the portion of flow of objects illuminated by the first light source. This makes it possible in particular better to reveal the contours of the objects in the flow of objects.

Advantageously and non-limitatively, said at least one second light source is installed so as to define a main illumination axis forming an acute angle with a plane wherein the device conveying said flow of objects extends. Thus the appearance of distinctive light contours on the edges of the objects is improved.

In particular, the second light source forms an angle of 30° to 45° with the plane wherein the device conveying said flow of objects extends, which provides relatively low-angle illumination able to illuminate a wide area of objects to be detected.

The system further comprises a unit for taking off objects connected to the classification device, the take-off unit being configured to take off objects in accordance with predetermined characteristics, obtained by means of the classification device.

In particular, the take-off unit is a robotic gripping unit.

Another object of the invention relates to a method for classifying objects to be sorted, comprising the following successive steps:

a) providing a flow of objects to be sorted;
b) illuminating at least part of said flow with at least one first light source and one second light source concomitantly, the first and second light sources being of different natures, and at least one of the two sources comprising wavelengths in the visible spectrum,
c) acquiring at least one image in the visible spectrum of said illuminated flow part;
d) detecting at least one object in said acquired image;
e) classifying said detected object according to the visual information acquired in said at least one image, such as the color and/or transparency and/or material thereof.

Advantageously and non-limitatively, the first light source is a source of white light, and the second light source is selected from a source of ultraviolet light, a source of monochrome light in the visible spectrum, or a mixture thereof.

The detection of the objects is improved in the visible spectrum since:

UV light generates a fluorescence phenomenon for certain materials, which will provide distinguishing characters for detection thereof, in particular the composition (material) of the waste, its mass, its shape, its surface or the thickness of certain parts thereof (i.e. shape or appearance), and the sources of monochrome light (of color) provide, in particular according to the material and/or the opacity of the waste, certain colored reflections (at the corners and some flat surfaces) and shadow regions, which improve the discrimination in a flow of waste. This is because the reflection zones and the shadow zones are different according to the shape, the surface, the orientation of some surfaces and corners, and the composition of the waste.

Advantageously and non-limitatively, the method further comprises a step of classification by infrared, comprising:

f) a step of irradiating at least part of the flow of waste by an infrared light source, in particular a source of light in the near infrared (NIR),
g) a step of detecting the infrared spectrum reflected from the irradiated flow of step f), by means of an infrared sensor,
h) a step of analyzing the infrared spectrum of step g) to classify the waste of said flow, in particular according to the material thereof.

Thus it is possible to add together the classification in the visible spectrum and in the ultraviolet, with a technique of classification by infrared, or near infrared, in accordance with a method known by the name Near Infra-Red (NIR).

The invention also relates to a waste sorting method, said method comprising the following successive steps:

a) a step of implementing the waste classification method as previously described; and
b) a step of automated waste sorting on the basis of the classification of step a), according to predetermined parameters, such as the material, the color and/or the transparency of the waste.

In particular, step b) is implemented by means of a robotic take-off unit.

As it uses the classification method of the invention, the sorting method makes it possible to obtain flows of sorted waste with a purity and/or a quality superior to that obtained with the conventional classification methods and systems using a single light source.

Furthermore, the method of the invention is easy to implement, in particular on commercial sorting units or detection gantries: the modifications to be made are minimal (simple addition of supplementary light sources, and optionally adjustment of the image bank).

Another object of the invention relates to a sorting assembly comprising:

a conveyor, said conveyor comprising an object classification zone and an object take-off zone, an object classification system as described previously, comprising a classification device positioned around or above said object classification zone.

The sorting assembly is in particular adapted for implementing the method described previously.

Within the meaning of the present invention, "two light sources of different natures" means two light sources wherein the spectrum of wavelengths emitted is not completely identical. For example, two light sources of different natures are a source of white light and a source of UV light, or a source of white light and a source of monochrome light.

Within the meaning of the present invention, an "ultraviolet (UV) light source" is a light source emitting light in the wavelengths lying between 10 and 400 nm. A UV source may emit in all or part of the ultraviolet spectrum.

Within the meaning of the present invention, "white light source" is a light source emitting light in the wavelengths lying between 400 and 700 nm, optionally between 400 nm and 670 nm. A white light source emits in the whole of the visible spectrum, unlike a monochrome light.

Within the meaning of the present invention, a "monochrome light source" is a light source emitting in only part of the visible light spectrum (i.e. over only part of the spectrum of white light). For example, a blue monochrome source can emit in the wavelengths lying between 470 and 485 nm, while a red monochrome source can emit in the wavelengths lying between 610 and 650 nm, and a green monochrome source can emit in the wavelengths lying between 500 and 555 nm.

Within the meaning of the present invention, an "infrared (IR) light source" is a light source emitting light in the wavelengths lying between 700 nm and 350 μm. An IR source can emit in all or part of the IR spectrum. Advantageously, the IR light source is a near infrared source, i.e. emitting light in the wavelengths lying between 700 nm and 2.5 μm, preferably between 1 and 2.5 μm.

Within the meaning of the present invention, an illumination “concomitantly” by at least two light sources means a common illumination and at the same time of at least part of the flow of waste, so as to obtain a superimposition of the light spectra of the two light sources on this flow of waste.

Within the meaning of the present invention, a “flow of waste” means a set of pre-sorted waste. It may be a case for example of waste coming from a selective household waste sorting channel, that is to say essentially comprising paper, cardboard, plastic and/or metal packaging (for example, it may be a mixture of PET bottles, HDPE bottles, aluminum or steel cans or boxes, of plastic films, or mixtures of paper and cardboard, such as newspapers, magazines, office paper, cardboard boxes or cartons, etc.). According to a particular embodiment, it is a set of “single-material” waste, that is to say waste mainly comprising (that is to say to the extent of more than 60% in number, preferably more than 70% by volume, even more preferably more than 85% by volume or even more than 95% by volume) elements of the same material. In particular, it is plastic waste, or a mixture of paper and cardboard waste.

Plastic waste comprises various types of plastic material: there is generally a mixture of transparent and opaque plastic materials, colored or not, in particular waste made from PET, PP (polypropylene), PE (polyethylene), in particular HDPE, PS (polystyrene) or all resins generally used in packaging.

Within the meaning of the present invention, the “classification of the waste” means the determination of a certain number of parameters associated with the waste, in particular the material, color and/or transparency thereof. This step is a preliminary to the sorting, which makes it possible to obtain batches of waste homogeneous in material, color and/or transparency, which is necessary for recycling. For example, the transparent PET obtained by recycling transparent PET will be a better quality if the “purity” and the homogeneity of the waste used for recycling is greater.

Within the meaning of the present invention, the term “classification” of waste is understood in the broad sense, comprising both the classification of the materials making up the waste, as disclosed previously, and the identification of the waste, for example by recognition of the shape thereof.

In the present invention, the percentages by number are calculated with respect to the total number of objects considered, in particular with respect to the total number of waste items to be classified or respectively to be sorted.

Waste Classification Method

According to a particular embodiment, the flow of waste comprises plastic waste, in particular made from transparent or opaque plastics material.

According to another particular embodiment, the flow of waste comprises paper and/or cardboard waste.

According to a variant, the flow of waste consists of paper and/or cardboard waste, in particular of different colors.

The flow of waste is supplied on a support, which may be light in color or dark in color. It should be noted that the color of the support may not be homogeneous in time and space. This is because the support is generally a conveyor belt. The color of the support can be selected so as to optimize the contrast effects during the illumination of step b).

Advantageously, the first light source being a source of white light, and the second light source being selected from a source of ultraviolet light, a source of monochrome light, or a mixture thereof.

The illumination of step b) is preferably continuous for the two light sources, so that the flow of waste is illuminated by a light with a spectrum that is homogeneous over time.

Typically, the second light source comprises an ultraviolet light source, optionally a combination with at least one monochrome light source. In particular, the second light source may consist of an ultraviolet light source. The UV light source can emit in the whole of or in part of the UV spectrum, according to the parameters to be determined, in particular in terms of the shape, material, opacity, thickness and/or color of the objects to be classified.

According to a particular embodiment, the second light source comprises a monochrome light source, such as a blue, green, yellow or red monochrome source, or a mixture thereof, provided that the combination thereof does not form white light. For example, the second light source comprises a blue or red monochrome source.

According to a particular embodiment, the second light source comprises an ultraviolet light source in combination with at least one monochrome light, in particular a red, green, blue or yellow monochrome light. In particular, the second light source may consist of an ultraviolet light source in combination with a monochrome light, such as a blue or red monochrome light.

According to a particular embodiment, the second light source comprises an ultraviolet light source in combination with at least two monochrome light sources, in particular a red, green, blue or yellow monochrome light source, preferably a red monochrome light source and a green monochrome light source.

The combination of light sources affords an appreciable increase in the identification performance by improving the discrimination in the recognition process for any object, whether it be:

- objects made from synthetic material, of the plastic bottle and flask type, plastic films, other plastic objects, synthetic fabrics, etc.),
- objects composed of organic materials (of the wood, paper, cardboard, cotton, etc. type), or
- metal materials (of the aluminum can or tray type, cans of preserves, aluminum film, etc.) or
- mineral materials (glass, ceramic, stone, sand, etc.).

Step c) is usual for a person skilled in the art.

The image of step c) means an image at an instant T. It can change over time (in particular because the flow of waste is in movement).

Step d) is implemented in particular by computer. It can comprise a substep of comparing an image part with an image bank, associating images with classification parameters such as color, opacity, thickness, material, etc. Step d) can also comprise an automated learning substep (“deep learning”) in particular by means of so-called artificial intelligence algorithms.

According to a variant of the invention, step d) also comprises an analysis of the degree of coverage of the support (in particular by means of the reinforcement of contrasts and contours, in particular for the transparent objects).

The classification method may further comprise a step of classification by infrared. Such a step typically comprises:

e) a step of irradiating the flow of waste by an infrared light source, in particular a source of light in the near infrared (NIR), f) detecting the infrared spectrum reflected from the flow irradiated at step e), using an infrared sensor, g) analyzing the infrared spectrum of step f) to classify the waste in said flow, in particular according to the material thereof.

Waste Classification Device

Advantageously, the first light source being a white light source, and the second light source being selected from an ultraviolet light source, a monochrome light source or a mixture thereof.

Advantageously, the light sources are continuous sources.

According to a particular embodiment, the second light source is an ultraviolet light source (5) optionally in combination with a monochrome light source (6, 7). According to a variant, the second light source consists of an ultraviolet light source. The UV light source can emit in all or part of the UV spectrum, according to the parameters to be determined, in particular in terms of material, opacity, thickness and/or color.

According to a particular embodiment, the second light source comprises a monochrome light source (6, 7), such as a blue, green, a yellow or red monochrome source, or a mixture thereof, provided that the combination thereof does not form white light. For example, the second light source comprises a blue or red monochrome light source.

According to a particular embodiment, the second light source comprises an ultraviolet light source in combination with at least two monochrome light sources, in particular a red, green, blue or yellow monochrome light source, preferably a red monochrome light source and a green monochrome light source.

According to a particular embodiment, the first light source is parallel to the flow of waste (i.e. the light rays are orthogonal to the flow of waste), and the second light source is parallel to the flow of waste.

In other words, when the first light source is parallel to the flow of waste, the axis of the light beam of the first light source is orthogonal to the flow of waste.

According to a particular embodiment, the first light source is parallel to the flow of waste, and the second light source forms an incident angle with the flow of waste (i.e. the light rays form an incident angle with the flow of waste). The incident angle makes it possible to optimize the contrasts and the classification. For example, the incident angle of the light rays with the flow of waste will then be approximately 30 or 60 degrees.

The visible-light sensor may be any sensor adapted for such use, in particular a camera that is active in the visible spectrum.

The image captured by the sensor means an image at an instant T. It can change over time (in particular because the flow of waste is in movement).

Waste Sorting Method

Step a) may be implemented according to any variant or particular or advantageous embodiment presented above in relation to the waste sorting method.

Advantageously, step b) is implemented by means of a robotic take-off unit.

The method according to the invention makes it possible to achieve sorting performance superior to the methods currently used. In particular, on a flow of single-material waste of the plastic type, the method of the invention makes it possible advantageously to achieve sorting performance 90% superior in number, preferably 95% superior in number.

Advantageously, the use of detection methods implementing machine learning techniques makes it possible to obtain sorting performance ranging up to 99% in number.

Within the meaning of the invention, the term sorting performance means the ability of the method to correctly detect the objects to be sorted, independently of the actual implementation of the sorting.

Device for Sorting a Flow of Waste

Advantageously, the waste classification device is positioned around said waste classification zone (2).

In particular, the waste is supplied on the conveyor belt. The latter serves as a support for the waste during the waste sorting step. The color of the support can be selected so as to optimize the contrast effects during the implementation of the methods of the invention. The color of the conveyor belt may not be homogeneous in time and space.

According to a particular embodiment, the sorting device further comprises a waste take-off unit connected to the classification device, the take-off unit being configured to take off waste according to predetermined characteristics, obtained by means of the waste classification device.

For example, the take-off unit is a robotic gripping unit. It may be any sorting robot known to persons skilled in the art adapted for such use.

According to a particular embodiment, the device further comprises a device for classifying waste by infrared, such as a gantry for classifying by infrared. Such a device for classifying waste by infrared typically comprises:

a zone for identifying waste in a flow, said zone comprising at least one infrared light source for illuminating the waste, an infrared sensor, said sensor being positioned so as to at least partly capture the image of the waste illuminated in the identification zone, and said sensor being connected to an infrared spectrum analysis unit adapted for classifying the waste, in particular according to the material thereof, on the basis of the spectrum captured by the infrared sensor.

DETAILED DESCRIPTION OF PREFERRED EMBODIMENTS

Figure 1:
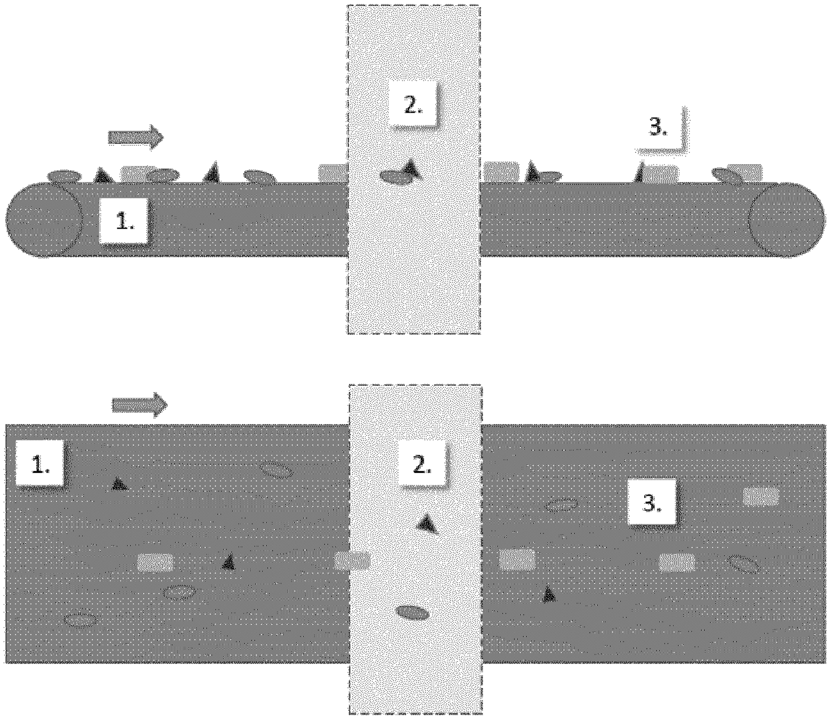
FIG. 1 shows an example of an embodiment of the invention. It is the case of a conveyor 1 equipped with a robot and an analysis system with a zone 2 for identifying the objects and a gripping zone 3 for the robot.
Figure 2:
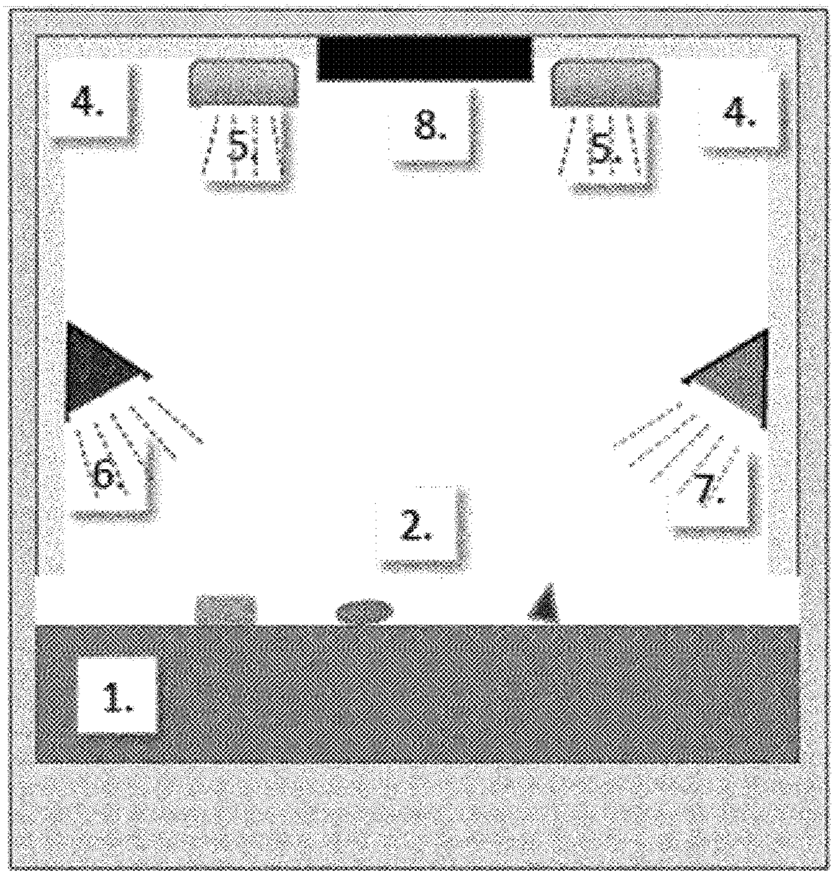
FIG. 2 shows in more detail the analysis system of FIG. 1. It comprises zones 4 for emitting white light, zones 5 for emitting UV light (for example a spotlight or a strip light) and/or zones 6, 7 emitting monochrome light, identical or different, and a zone 8 for detecting visible light (for example a camera).

The embodiment described and the following examples that are associated therewith are given purely for illustration and must not be considered to limit the invention in any way.

According to a first embodiment of the invention, an object sorting assembly, for example for sorting waste, comprises a conveyor, such as a belt conveyor 1, moving a flow of objects to be sorted, a system for classifying the flow of objects and a sorting device for sorting the objects in a sorting zone 3 according to the classification thereof.

The classification system comprises an image acquisition device 8, a classification device for classifying the objects to be sorted according to at least one image acquired and at least two light sources 4, 5, 6, 7 as described below.

The flow of objects to be sorted is composed of a plurality of objects of various natures, such as objects to be recycled.

The objects to be recycled may in particular comprise aluminum objects, such as cans, or objects made from transparent and/or opaque polyethylene terephthalate (PET), such as plastic bottles, containers of household or hygiene products, but these examples are non-limitative and any object known in the field of the recycling objects and the processing of waste may be an object to be sorted within the meaning of the present invention.

The image acquisition device 8 is adapted to capture one or more images of a predefined zone 2 on the belt conveyor 1. Thus the image acquisition device 8 acquires, for a given instant, an image of the portion of flow of objects passing through the field of vision of the image acquisition device 8, here referred to as the object identification zone.

In this embodiment the image acquisition device 8 is a camera capturing images in the visible spectrum, but the invention is however not limited to a single type of camera, and may also use a photographic apparatus or any other device adapted for capturing images.

It is generally accepted that the visible spectrum corresponds to a range of wavelengths in vacuum ranging from 380 nm to 780 nm, however the camera used by the invention is not limited to this defined range, and the camera may in particular capture images going beyond this wavelength range, for example by also capturing ultraviolet light lying between 200 nm and 380 nm, and then a hyper-spectral camera is spoken of; or on the other hand going below this wavelength as long as the camera is adapted to capture usable images of the objects to be processed according to the illumination conditions described below.

The objective of the camera is to acquire an image of the portion of flow of objects making it possible to classify the objects visible in the image.

Classification means defining the shape, material or type of the object visible in the image.

Thus the image acquisition device 8 transmits the images acquired to the classification device, which detects and classifies the objects and, object by object, determines the sorting to be done. Then the classification device instructs the sorting device to execute the sorting according to the detection done.

To obtain a reliable image analysis, it is relatively important to define lighting adapted to the good visibility of the objects in the identification zone 2 corresponding substantially to the field of vision of the camera.

In practice, the classification device frequency comprises a classification gantry passing over the object conveyor. The camera can then be installed under the gantry or at a distance from the gantry, so that the identification zone 2 is defined as the zone extending under the classification gantry.

The identification zone 2 is illuminated with a main light 4, also referred to as the first light source 4.

This first light source 4 is not necessarily made from a single point of emission. In particular, the first light source 4 is generally adapted to provide uniform illumination over the identification zone 2. Thus it is possible to arrange a plurality of identical lights forming the first light source 4.

This first light source 4 is, in the first embodiment of the invention, a set of white lights 4 distributed overhanging the acquisition zone.

However, this first light source 4 is not necessarily white and may emit any other color, adapted to an image analysis after acquisition by an image acquisition device such as a camera in the visible spectrum.

The purpose of this first light source 4 is in particular to define relatively uniform lighting able to allow sharp and contrasted acquisition of the objects in the portion of the flow of objects in the field of vision of the camera while reducing the appearance of visual artifacts that could affect the analysis of the images acquired, such as shadows or reflections caused by the lighting.

In order to improve the classification of the objects present in the image acquired, a second light source 5, 6, 7 is added.

This second light source 5, 6, 7 is selected according to the materials that it is wished to identify, in particular in the portion of flow of objects analyzed.

This second light source 5, 6, 7 may be obtained by a light having a color distinct from the main light.

The examples described below illustrate in particular the results obtained by combining a first light source with a second light source 5 diffusing ultraviolet, as well as the visual improvement obtained according to the materials of the objects present in the portion of flow of objects analyzed.

EXAMPLES

Example 1: Irradiation with Combination of Visible and UV Lights on Waste of the Transparent Plastic Packaging Type Equipment

- Dark-colored support: 2 cm panel made from graphite expanded polystyrene;
- Light-colored support: 2 cm panel made from extruded polyurethane;
- White light: set of 4 LED lamps placed at the 4 corners of the panels, type GU10, 5 W, 400 lumens, warm white 2700-3000 K over 110°;

Uv Light:

- One 20 W black-light tube, 60 cm long (situated just below the bottom part of the photograph),
- One 15 W T3 mini-spiral fluocompact bulb (situated along the right-hand side of the photograph);

Image sensor: Photographic apparatus of the Panasonic Lumix type, DMC-PZ 100, automatic mode in MP4.

Results

Figure 3:
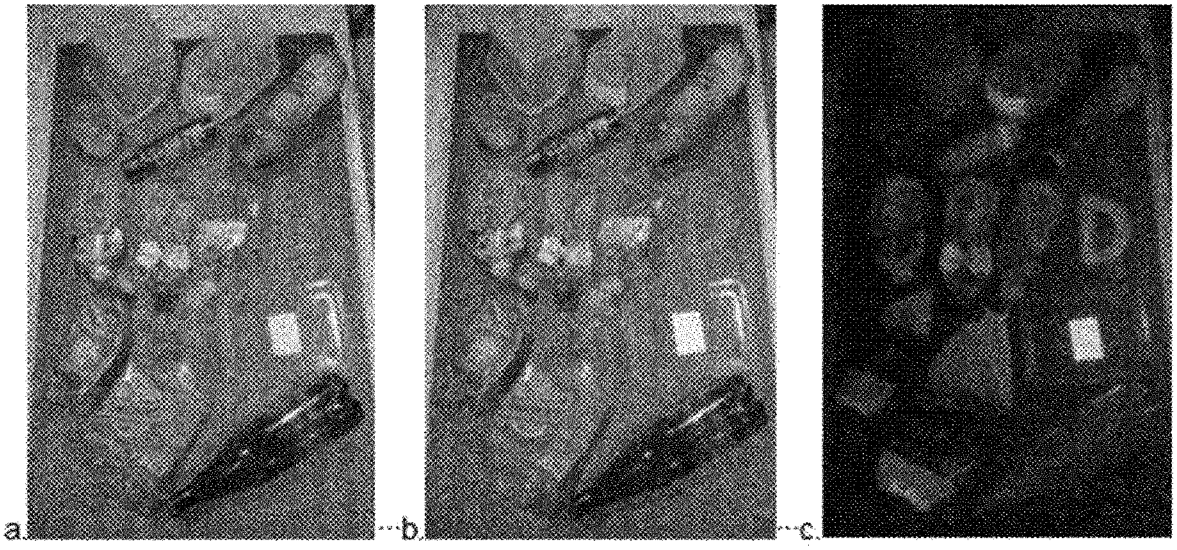
FIG. 3 Transparent plastic packages on a dark surface: a. visible light only—b. visible light+UV—c. UV only.
Figure 4:
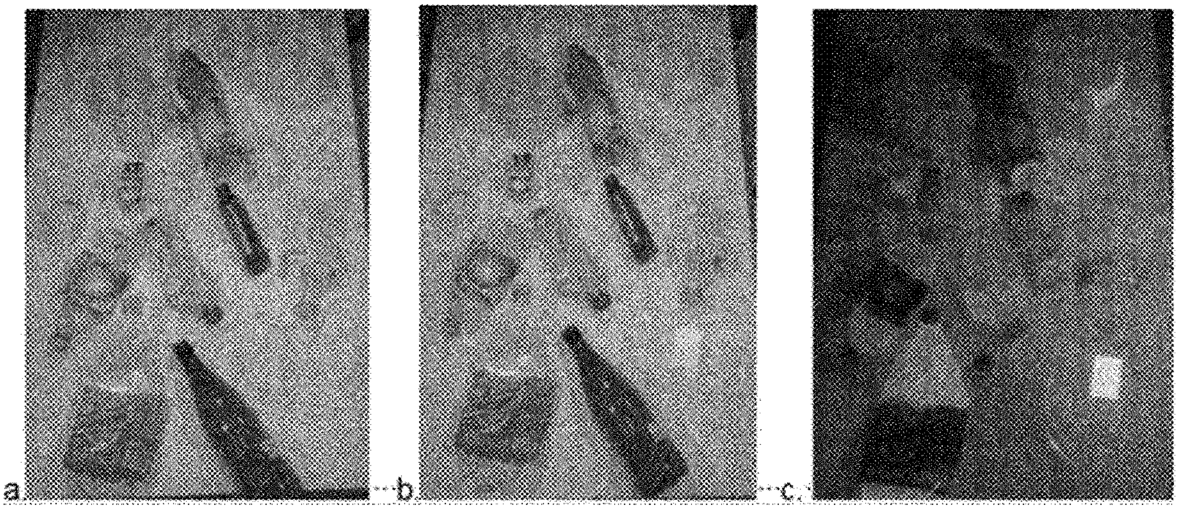
FIG. 4 Transparent plastic packages on a pink surface: a. visible light only—b. visible light+UV—c. UV only.

Waste of the transparent plastic packaging type is disposed randomly on a dark support (FIG. 3) or on a light support (pink, FIG. 4). The waste is illuminated solely with white light (FIGS. 3*a* and 4*a*), a combination of UV light and white light (FIGS. 3*b* and 4*b*), or with UV light alone (FIGS. 3*c* and 4*c*).

It is observed that:

- White paper and labels stand out more;
- Transparent PET exhibits a white veil by fluorescence, which is all the more marked, the thicker is it; and
- Fluorescence of transparent plastics is more visible on a dark non-reflective background.

Example 2: Irradiation with Combination of Visible and UV Lights on Waste of the Opaque Plastic Packaging Type The same equipment as in example 1 is used for implementing example 2.

Figure 5:
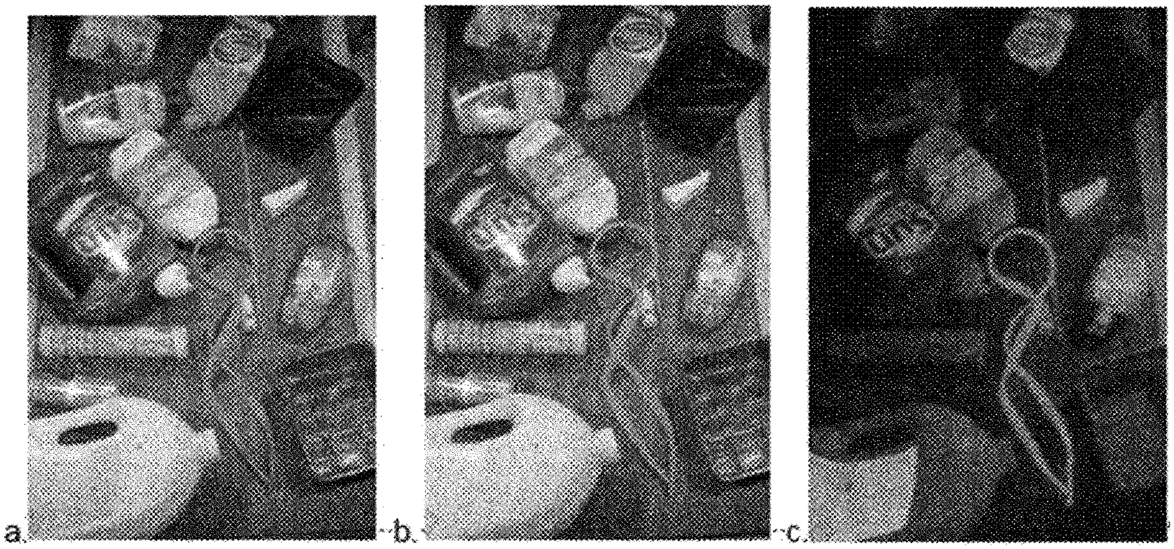
FIG. 5 Opaque/aluminum plastic packages on a dark surface: a. visible light only—b. visible light+UV—c. UV only.
Figure 6:
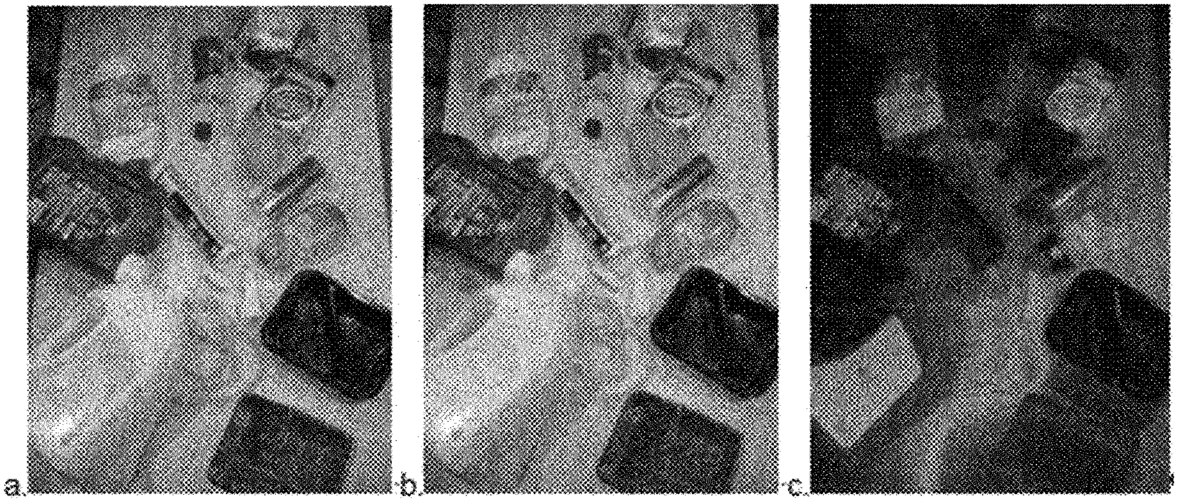
FIG. 6 Opaque/aluminum plastic packages on a pink surface: a. visible light only—b. visible light+UV—c. UV only.

Waste of the opaque plastic packaging type is disposed randomly on a dark support (FIG. 5) or on a light support (pink, FIG. 6). The waste is illuminated with white light alone (FIGS. 5*a* and 6*a*), a combination of UV light and white light (FIGS. 5*b* and 6*b*), or with UV light alone (FIGS. 5*c* and 6*c*).

It is observed that:

white paper and labels stand out more, and

PE and PP do not really change color whereas other plastics are illuminated by fluorescence, exhibiting a discriminating character more advanced than simply white light.

Example 3: Irradiation with Combination of Visible and UV Lights on Waste of the Paper and Cardboard Type The same equipment as in example 1 is used for implementing example 3.

Figure 7:
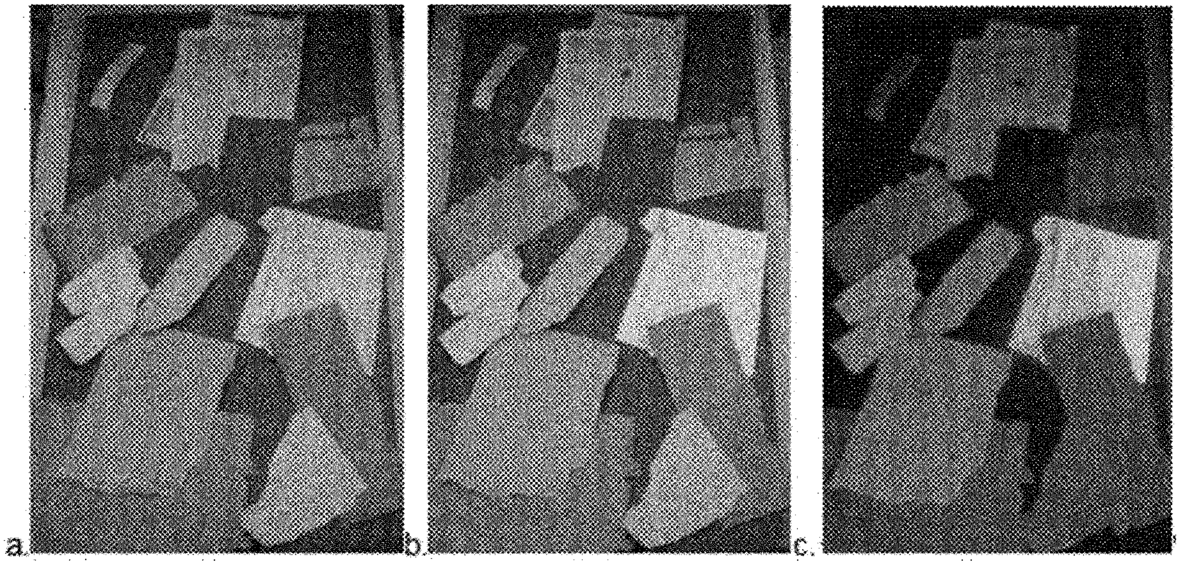
FIG. 7 Paper/cardboard on a dark surface: a. visible light only—b. visible light+UV—c. UV only.

Waste of the paper and cardboard packaging type is disposed randomly on a dark support (FIG. 7). The waste is illuminated with white light only (FIG. 7*a*), a combination of UV light and white light (FIG. 7*b*), or with UV light alone (FIG. 7*c*).

It is observed that:

White paper appears much whiter (by fluorescence).

The contrast between brown, white and grey cardboard is much greater.

CONCLUSIONS

Thus it is noted that adding an ultraviolet UV light source 5, in addition to visible light 4, for image recognition makes it possible to provide additional distinguishing characteristics for visual recognition and gives rise to an increase in the recognition performance in some sorting scenarios.

This is because illuminating objects by ultraviolet 5 makes it possible to add, by fluorescence, distinguishing pixels in the images acquired, which improves the efficacy of the image-analysis and object-classification methods.

The invention is however not limited to a second light source diffusing ultraviolet.

According to a particular embodiment of the invention, the second light source 6, 7 comprises a monochrome light in the visible spectrum, with a color different from white, for example green or red.

As with the main light, the second light source is not limited to a single emission point. Here the second light source consists of two light sources 6, 7, with identical optical characteristics, but opposite each other with respect to the flow of objects, or in other words each on one side of the identification zone 2.

This second light source 6, 7 is then diffused at an angle differing from the main emission angle of the first light source 4.

In particular, each emission point of the second light source 6, 7 is installed so that the main emission axis thereof forms an angle lying substantially between 30° and 45° with the normal to the support on which the objects of the portion of objects being analyzed are installed.

Main emission axis means the axis forming the center of the light beam emitted by the light source 6, 7.

The objective of the particular arrangement of this second light source 6, 7 is to allow the appearance of reflections on the objects, and in particular to color the edges of the objects, so as to reveal on the images acquired the borders of the objects in the color of the second light source 6, 7.

Thus, if the second light source is red, the borders of the objects of the identification zone will reflect the red color, this color being able to vary with the color of the material concerned, which relatively greatly facilitates the classification of the objects in the image acquired.

According to a particular embodiment of the invention, the second light source 6, 7 could have a color similar to the first light source but with a distinct emission intensity, for example with an appreciably greater illumination intensity, so that the borders of the objects will be over-illuminated.

It is also possible to combine the above embodiments, and in particular to define a classification system comprising a main light source 4, a second light source 6, 7 in the visible spectrum, for example with a color distinct from the main light source 4, and a third light source 5 emitting an ultraviolet light as previously described, this making it possible to combine the advantages described previously.

Moreover, it is possible to combine a second light source 5, 6, 7 and optionally an additional light source, for example an ultraviolet source and a light source in the visible spectrum, for example red or green, with illumination by infrared, or near infrared.

In the field of the sorting of objects, the technique of classification by infrared, or near infrared (better known by the term NIR), is well known to a person skilled in the art, and this technique of classifying the materials may be combined with the detection means described in the present invention.

The invention also relates to a method for classifying the objects in a flow of objects, comprising in particular a step of providing a flow of objects to be sorted, such as a flow of waste.

A step of illuminating an identification zone 2 through which at least a portion of the flow of objects is passing at a given instant is implemented.

The illumination is implemented by disposing a first light source 4 and a second light source 5, 6, 7 having a nature distinct from the first light source 4.

Then, by means of an image acquisition device 8, at least one image of said portion of the flow of objects is acquired at the given instant.

This image is transmitted to the classification device, which detects and classifies the objects present in the image. The double illumination disclosed previously makes it possible in particular:

when the second light source is an ultraviolet source, to classify the materials by the fluorescence that can be produced on the objects in the flow of objects, as described in the previous examples; and/or when the second light source is a monochrome source of the spectrum in the visible range, for example red or green or any other visible color, to classify the objects in particular by improving the contours of these objects.

Thus the illumination step makes it possible to improve the result obtained at the classification step.

Next, depending on the classification of the objects present in the image acquired, the sorting device is instructed to proceed with the sorting of the objects detected, in accordance with normal practice in the sorting field.

Classifying the objects can thus be freely adapted for:

classifying the materials constituting the objects of the acquired image, for example by evaluating the fluorescence during illumination by UV; and/or recognizing objects by implementing the image recognition method, in particular by identifying remarkable contours and shapes.

This recognition step can be implemented by conventional image recognition methods or machine learning methods, such as neural networks. In particular, convolutional neural networks are particularly effective for implementing object recognition in an acquired image.

The invention claimed is:

1. A system for classifying objects in a flow of objects to be sorted, the flow of objects to be sorted being installed on a conveying device (1), said system comprising:

an image acquisition device (8) comprising a sensor for acquiring an image in the visible spectrum and installed so as to be able to acquire an image of a portion of the flow of objects to be sorted;

a first light source (4), emitting a first light of a first light spectrum in the visible spectrum, the first light source (4) being installed overhanging and illuminating, with all of the first light spectrum of the first light, said portion of flow of objects to be sorted to thereby allow the appearance of first visual information in the visible spectrum on said image being acquired by the sensor of the image acquisition device (8);

at least one second light source (5, 6, 7) emitting a second light of a second light spectrum distinct from the first light spectrum of the first light from the first light source (4), the second light of the second light spectrum allowing the appearance of additional visual information not present in the first information in the visible spectrum on said image acquired by the sensor of the image acquisition device (8), wherein the additional visual information adds to first visual information provided by the first light of the first light spectrum from the first light source (4), wherein the first light source (4) and the at least one second light source (5, 6, 7) concomitantly, with all of the first light spectrum of the first light and all of the second light spectrum of the second light, illuminate said portion of flow of objects to be sorted, thereby allowing the appearance of the additional visual information in the visible spectrum on said image acquired and captured, the first visual information and the second visual information concomitantly captured by the sensor of the image acquisition device; and a classification device configured to classify the objects in said portion of the flow of objects to be sorted according to said first visual information in said image acquired and to classify said objects in said portion of the flow of objects according to said additional visual information in said image acquired.

2. The system according to claim 1, wherein said at least one second light source (5) emits an ultraviolet light allowing the appearance of fluorescence in the visible spectrum when an object in the portion of flow of objects reacts to the ultraviolet.

3. The system according to claim 2, further comprising a unit for taking off objects connected to the classification device, the take-off unit being configured to take off objects in accordance with predetermined characteristics, obtained by means of the classification device.

4. The system according to claim 1, wherein said at least one second light source (6, 7) emits a light in the visible spectrum, with a color distinct from the first light source (4), and oriented so as to illuminate, at an illumination angle distinct from the first light source (4), the objects in the portion of flow of objects illuminated by the first light source (4).

5. The system according to claim 4, wherein said at least one second light source (6, 7) is installed so as to define a main illumination axis forming an acute angle with a plane wherein the device conveying said flow of objects extends.

6. The system according to claim 4, wherein the second light source (6, 7) forms an angle of 30° to 45° with the plane in which the device conveying said flow of objects extends.

7. The system according to claim 4, further comprising a unit for taking off objects connected to the classification device, the take-off unit being configured to take off objects in accordance with predetermined characteristics, obtained by means of the classification device.

8. The system according to claim 1, further comprising a unit for taking off objects connected to the classification device, the take-off unit being configured to take off objects in accordance with predetermined characteristics, obtained by means of the classification device.

9. The system according to claim 8, wherein the take-off unit is a robotic gripping unit.

10. A sorting assembly comprising:

a conveyor (1), said conveyor comprising an object classification zone and an object take-off zone, an object classification system according to claim 1, comprising a classification device positioned around or above said object classification zone.

11. The system according to claim 1, wherein said at least one second light source (6, 7) emits a light in the visible spectrum, with a color and an intensity distinct from the first light source (4), and oriented so as to illuminate, at an illumination angle distinct from the first light source (4), the objects in the portion of flow of objects illuminated by the first light source (4).

12. A method for classifying objects to be sorted based on an acquired image of the objects to be sorted, the method comprising the following successive steps:

a) providing a flow of objects to be sorted;

b) concomitantly illuminating at least part of said flow with at least one first light source emitting a first light spectrum and one second light source emitting a different, second light spectrum, the first (4) and second light sources (5, 6, 7) being of different natures, and at least one of the two light sources comprising wavelengths in the visible spectrum, said first light source of the first light spectrum allowing the appearance of first visual information on said acquired image and said second light source (5, 6, 7) of the second light spectrum allowing the appearance of additional visual information not present in the first information in the visible spectrum on said acquired image, the additional visual information being information in addition to the first visual information provided by the first light source (4);

c) acquiring the image in the visible spectrum of said illuminated flow part with a sensor of an image acquisition device;

d) detecting at least one object in said acquired image;

e) classifying said detected object according to the first visual information acquired in said image, and according to said additional visual information acquired in said image.

13. The method according to claim 12, wherein:
the first light source (4) is a source of white light, and
the second light source (5, 6, 7) is selected from a source of ultraviolet light, a source of monochrome light in the visible spectrum, or a mixture thereof.

14. The method according to claim 12, further comprising a step of classification by infrared, comprising:
f) a step of irradiating at least part of the flow of waste by an infrared light source,
g) a step of detecting the infrared spectrum reflected from the irradiated flow of step f), by means of an infrared sensor,
h) a step of analyzing the infrared spectrum of step g) to classify the waste of said flow.

15. The method of claim 14, wherein the infrared light source of step f) is a source of light in the near infrared (NIR), and wherein the classifying of step h) is performed according to the material thereof.

16. A waste sorting method, said method comprising the following successive steps:
a) a step of implementing the waste classification method according to claim 12; and
b) a step of automated waste sorting on the basis of the classification of step a), according to predetermined parameters.

17. The method according to claim 16, wherein step b) is implemented by means of a robotic take-off unit.

18. The method of claim 16, wherein the predetermined parameters comprise the material, the color and/or the transparency of the waste.

19. A sorting assembly comprising:
a conveyor (1), said conveyor comprising an object classification zone and an object take-off zone,
a system for classifying objects in a flow of objects to be sorted, the flow of objects to be sorted being installed on a conveying device (1), said system comprising:
an image acquisition device (8) for acquiring an image in the visible spectrum installed so as to be able to acquire at least one image of a portion of the flow of objects to be sorted;
a first light source (4), emitting a first light of a first light spectrum in the visible spectrum, the first light source (4) being installed overhanging and illuminating said portion of flow of objects to be sorted to allow the appearance of first visual information in the visible spectrum on said image, said image of which is acquired by the image acquisition device (8);
a classification device able to classify the objects in said portion of the flow of objects to be sorted according to said image acquired;
at least one second light source (5, 6, 7), emitting a second light of a second light spectrum with a nature distinct from the first light from the first light source (4) and, concomitantly with the first light source (4), illuminating said portion of flow of objects to be sorted, allowing the appearance of additional visual information in the visible spectrum on said image acquired, wherein the additional visual information adds visual information not provided by the first light from the first light source (4) including additional distinguishing pixels in said image in order to improve the classification of the objects in said at least one image; and
the classification device further being adapted to classify said objects in said portion of the flow of objects according to said additional visual information,
the object classification system comprising a classification device positioned around or above said object classification zone,
wherein the sorting assembly is adapted to implement the method according to claim 12.

20. The method of claim 12, wherein in step e), the visual information acquired in said at least one image is the color and/or transparency and/or material thereof.

* * * * *